United States Patent
He et al.

(10) Patent No.: US 11,671,793 B2
(45) Date of Patent: Jun. 6, 2023

(54) CHANNEL FREQUENCY RESPONSE RECONSTRUCTION ASSISTED TIME-OF-ARRIVAL ESTIMATION METHOD

(71) Applicant: SAMSUNG ELECTRONICS CO., LTD., Suwon-si (KR)

(72) Inventors: Ziming He, Barnet (GB); Fei Tong, Bassingbourn (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 17/313,473

(22) Filed: May 6, 2021

(65) Prior Publication Data

US 2022/0191646 A1     Jun. 16, 2022

(30) Foreign Application Priority Data

Dec. 10, 2020   (KR) .................... 10-2020-0172607

(51) Int. Cl.
*H04W 4/029*     (2018.01)
*G01S 5/10*      (2006.01)

(52) U.S. Cl.
CPC .............. *H04W 4/029* (2018.02); *G01S 5/10* (2013.01)

(58) Field of Classification Search
CPC ........ H04W 4/029; G01S 5/10; G01S 5/0218; G01S 11/08; H04L 25/0222; H04B 17/391
See application file for complete search history.

(56) References Cited

U.S. PATENT DOCUMENTS

| | | | |
|---|---|---|---|
| 7,164,649 B2 * | 1/2007 | Walton | H04L 1/0015 370/252 |
| 8,259,829 B2 | 9/2012 | Rodero et al. | |
| 9,083,419 B2 | 7/2015 | Alexander et al. | |
| 9,681,267 B2 | 6/2017 | Sommer | |
| 10,573,328 B2 | 2/2020 | Briand et al. | |
| 10,746,844 B2 | 8/2020 | Chuo et al. | |
| 2005/0113142 A1 | 5/2005 | Felter | |
| 2007/0153930 A1 * | 7/2007 | Reid | H04L 27/2662 375/260 |
| 2009/0046792 A1 | 2/2009 | Xu et al. | |

(Continued)

OTHER PUBLICATIONS

He, et al., Improved High Resolution TOA Estimation for OFDM-WLAN Based Indoor Ranging, IEEE Wireless Communications Letters, vol. 2, No. 2, Apr. 2013, pp. 163-166.

(Continued)

*Primary Examiner* — Kabir A Timory
(74) *Attorney, Agent, or Firm* — F. Chau & Associates, LLC

(57) ABSTRACT

The present disclosure describes systems and methods for time-of-arrival (TOA) estimation techniques. Some embodiments of the disclosure provide for estimating radio propagation path parameters based on a training signal received over a set of active frequencies. The radio propagation path parameters (e.g., fading coefficients for each path) are used to reconstruct a channel frequency response on null frequencies (e.g., frequencies that did not include or carry the received training signal). A time-of-arrival parameter can then be estimated based on the estimated channel frequency response and the reconstructed channel frequency response (e.g., the channel frequency response estimated using both active frequencies and null frequencies).

20 Claims, 5 Drawing Sheets

(56) References Cited

U.S. PATENT DOCUMENTS

| | | |
|---|---|---|
| 2017/0280294 A1 | 9/2017 | Sommer |
| 2019/0253089 A1 | 8/2019 | Wu et al. |
| 2019/0253282 A1 | 8/2019 | Hadaschik et al. |
| 2020/0166631 A1 | 5/2020 | Tong et al. |

OTHER PUBLICATIONS

Lee, et al., "Ranging in a Dense Multipath Environment Using an UWB Radio Link", IEEE Journal on Selected Areas in Communications, vol. 20, No. 9, Dec. 2002, pp. 1877-1883.

Li, et al., "Super-Resolution TOA Estimation With Diversity for Indoor Geolocation", IEEE Transactions on Wireless Communications, vol. 3, No. 1, Jan. 2004, pp. 224-234.

Fleury, et al., "Channel Parameter Estimation in Mobile Radio Environments Using the SAGE Algorithm", IEEE Journal on Selected Areas in Communications, vol. 17, No. 3, Mar. 1999, pp. 434-450.

* cited by examiner

CHANNEL FREQUENCY RESPONSE RECONSTRUCTION ASSISTED TIME-OF-ARRIVAL ESTIMATION METHOD

CROSS-REFERENCE TO RELATED APPLICATION

This application claims priority to, and the benefit of, Korean Application Serial No. KR10-2020-0172607 filed on Dec. 10, 2020 int eh Korean Patent Office. The entire contents of the foregoing application are hereby incorporated by reference for all purposes.

BACKGROUND

The following relates generally to localization techniques, and more specifically to time-of-arrival (TOA) estimation techniques. Wireless networks may implement localization techniques to determine positions of devices (e.g., a transmitter and a receiver) relative to each other within the wireless network. Position information can be used in many location-based applications, such as to manage coverage and service (e.g., to determine where a receiving device is relative to a coverage area of a transmitting device), to perform position specific commands (e.g., for a transmitting device to transmit commands or for a receiving device to perform certain actions based on a location of the receiving device), etc.

In some cases, localization in wireless networks (e.g., such as in global positioning systems (GPS)) is based on TOA techniques. TOA may refer to a time instant when a radio signal is received by a receiving device (e.g., a time instant when a receiving device receives a radio signal transmitted by a transmitting device). As radio signals travel with an accurately estimated velocity (e.g., a known propagation speed), distance between the transmitting device and the receiving device can be calculated using estimated TOA and radio signal velocity. For instance, distance can be calculated as velocity multiplied by time. Accordingly, TOA techniques can be used to determine the time elapsed between signal transmission and signal transmission, and distance can be determined by multiplying the time duration by a radio signal velocity constant. Such distances can be used for various location-based applications (e.g., where relative distances are calculated, or where absolute distances are calculated when an absolute position of either the receiving device or the transmitting device is known).

However, advancing localization applications (e.g., such smart home applications, internet of things (IoT) applications, etc.) may demand increased localization accuracy. Some TOA techniques may make assumptions that compromise localization accuracy in real world applications. For instance, some TOA techniques assume that a wireless channel is modeled as a discrete time sampled-space model, that a wireless channel is a single-path channel, etc. Such techniques may provide accurate localization under such assumptions, but may be associated with degraded performance in real world applications. Therefore, there is a need in the art for improved TOA based localization techniques.

SUMMARY

The present disclosure describes systems and methods for time-of-arrival (TOA) estimation techniques. Some embodiments of the disclosure provide for estimating radio propagation path parameters based on a training signal received over a set of active frequencies. The radio propagation path parameters (e.g., fading coefficients for each path) are used to reconstruct a channel frequency response on null frequencies (e.g., frequencies that did not include or carry the received training signal). A time-of-arrival parameter can then be estimated based on the estimated channel frequency response and the reconstructed channel frequency response (e.g., the channel frequency response estimated using both active frequencies and null frequencies).

A method, apparatus, non-transitory computer readable medium, and system for time-of-arrival estimation techniques are described. One or more embodiments of the method, apparatus, non-transitory computer readable medium, and system include estimating a number of radio propagation paths and a fading coefficient of each of the radio propagation paths based on a channel frequency response value, wherein the channel frequency response value is estimated based on a training signal over a set of active frequencies, reconstructing the channel frequency response value for a set of null frequencies based on the number of radio propagation paths and the fading coefficient of each of the radio propagation paths, and estimating a time-of-arrival parameter based on the reconstructed channel frequency response value.

DETAILED DESCRIPTION

The present disclosure describes systems and methods for time-of-arrival (TOA) estimation techniques. Some embodiments of the disclosure provide for estimating a TOA parameter based on an estimated channel frequency response (CFR) on active frequencies and a reconstructed CFR on null frequencies. Such techniques efficiently combine the multipath parameter estimation (e.g., for CFR reconstruction) and TOA estimation, which improves TOA estimation accuracy in multipath scenarios, in scenarios with a limited signal bandwidth, etc.

Some TOA estimation techniques may include subspace based approaches, multipath parameter based approaches, maximum peak-to-leakage ratio (MPLR) approaches, etc. However, such approaches may make assumptions such as modeling a wireless channel as a discrete time sampled-space model, modeling a wireless channel as a single-path channel, etc. These assumptions may be unrealistic. As a result, high localization accuracy may be compromised in real world applications.

By contrast, the techniques described herein create more CFR data on a wider signal bandwidth (e.g., via reconstructing CFR on null frequencies), which may improve the TOA estimation accuracy. That is, the techniques described herein fill in the CFR on null subcarriers (e.g., in orthogonal frequency division multiplexing (OFDM) systems). Accordingly, channel impulse response (CIR) distortion in applied MPLR techniques can be reduced or avoided, and accuracy of TOA estimation techniques can be improved.

Embodiments of the present disclosure may be used in the context of localization procedures. For example, wireless networks (e.g., wireless communications systems) can employ more accurate localization procedures, which can improve applications that rely on device localization as well as enable new applications that rely on more accurate device localization. An example of an application of the inventive concept in the context of an example wireless network is provided with reference to FIGS. 1 and 2. Details regarding an example device architecture supporting described TOA estimation techniques are provided with reference to FIG. 3. Example processes for performing described TOA estimation techniques are provided with reference to FIGS. 4 and 5.

Figure 1:
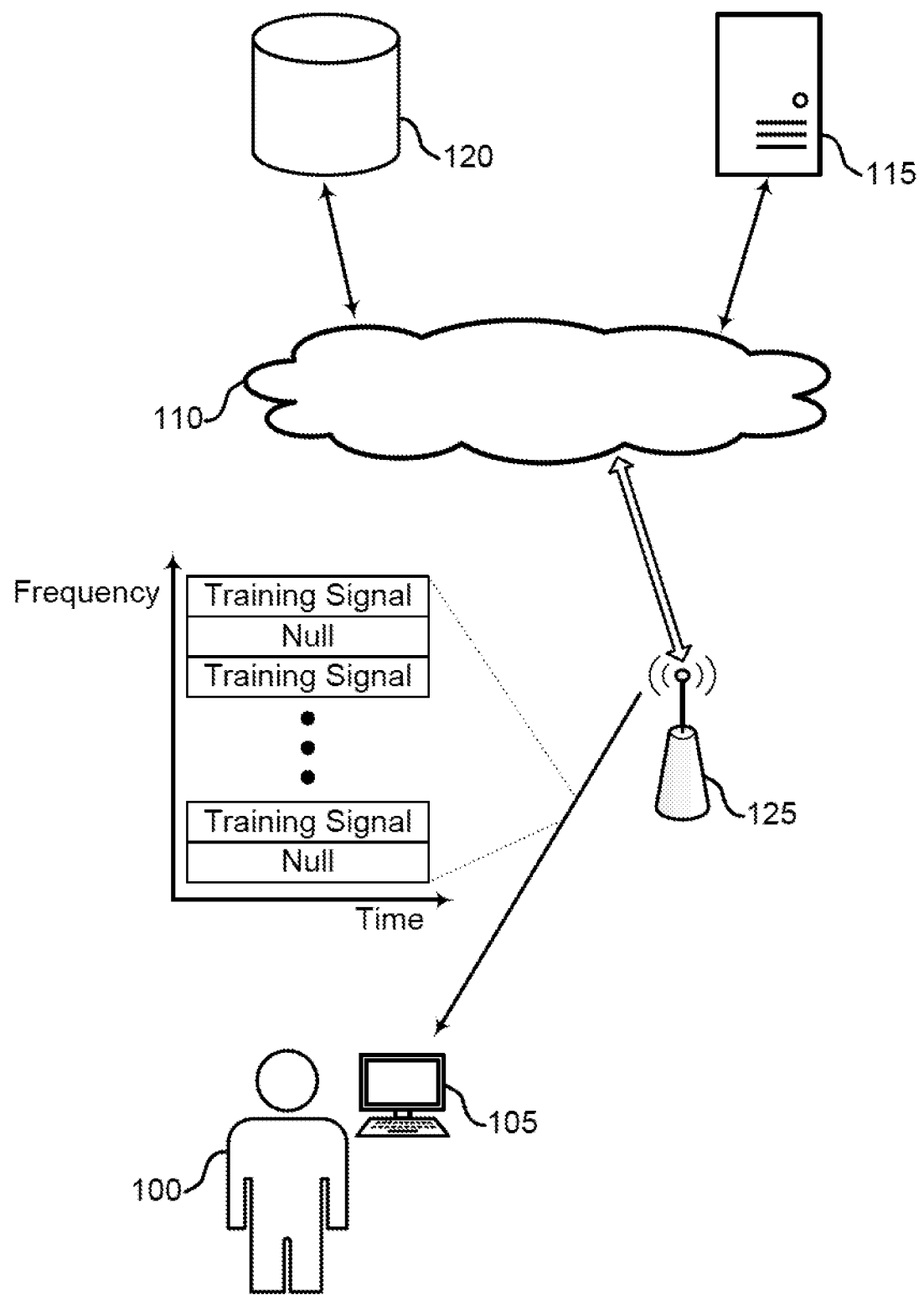
FIG. 1 shows an example of a wireless network according to aspects of the present disclosure.

FIG. 1 shows an example of a wireless network according to aspects of the present disclosure. The example shown includes user 100, device 105, cloud 110, server 115, database 120, and transmitting device 125. Device 105 is an example of, or includes aspects of, the corresponding element described with reference to FIGS. 2 and 3. Transmitting device 125 (e.g., an access point, a base station, etc.) is an example of, or includes aspects of, the corresponding element described with reference to FIG. 2.

In the example of FIG. 1, device 105 (e.g., a receiving device) receives a signal from transmitting device 125 to perform a localization procedure. Transmitting device 125 may transmit a training signal, and device 105 may estimate TOA of the training signal that can be used to determine location or position information of the device 105, the transmitting device 125 or both. For example, a distance between the device 105 and the transmitting device 125 can be calculated based on signal propagation speed and the time elapsed for the signal to reach the receiving device 105 (e.g., where the time elapsed may be calculated based on estimated TOA). Accordingly, the more accurate the TOA estimation is calculated, the more accurate the location or position information may be determined.

In some cases, a training signal can be transmitted over certain frequencies (e.g., over an active set of subcarriers or frequency regions). A training signal may generally include any signal transmitted between wireless devices for synchronization, calibration, etc. For example, a training signal may be used for localization procedures, frequency alignment, timing alignment, etc. In some cases, null frequencies (e.g., or null subcarriers) may not include the training signal. Null frequencies can be at the boundaries (e.g., upper and lower edges) of the training signal, may be interleaved between active subcarriers, etc. As described herein, in addition to estimating CFR on the training signal received over a set of active frequencies, device 105 may reconstruct CFR for null frequencies. Such may provide for CFR data on a wider signal bandwidth (e.g., via reconstructing CFR on null frequencies), which may improve the TOA estimation accuracy, improve applications relying on localization procedures, enable new applications demanding highly accurate localization techniques, etc.

The example of FIG. 1 is provided for illustrative purposes and is not intended to limit the scope of the present disclosure. The TOA estimation techniques described herein may be implemented in other applications by analogy, without departing from the scope of the present disclosure. In some examples, TOA estimations can be used to determine relative position information (e.g., position of the receiving device 105 relative to the transmitting device 125, and vice versa, can be estimated based on the distance between the receiving device 105 and the transmitting device 125). Additionally or alternatively, TOA estimations can be used to determine absolute position information (e.g., absolute position information for the receiving device 105 can be estimated when the absolute position information is known for the transmitting device 125, and vice versa, based on estimated distance between the receiving device 105 and the transmitting device 125).

A device 105 may include a mobile device, a personal computer, a laptop computer, a mainframe computer, a robot, a smart home device, a sensor, a personal assistant, or any other suitable processing apparatus. Generally, the techniques described herein may be implemented to perform localization procedures (e.g., estimate location information, estimate position information, estimate object or device orientation, etc.) associated with such devices 105.

An example application of one or more techniques described herein may include home automation systems. Home automation may allow a user to monitor and control functions of a residence. A residence in which automation may be controlled by a user remotely may be referred to as a smart home. Smart homes may enable automation of multiple systems, which may include lighting, HVAC, security, appliances, and others. A smart home may automate blinds, lights, and lamps. Additionally, a smart home may allow user control of systems such doors, temperature, security components, and others remotely. Smart homes may enable energy savings for a user. HVAC systems may have customizable schedules for heating and cooling. Automation of heat and lighting may allow users to reduce their usage while the user is away. Additionally, smart homes may prevent damage. Sensors to detect water leaks or other hazards in a home may enable systems to stop damage before it happens. Smart homes may be built on a variety of protocols, each of which may be suitable for certain situations.

In some cases, the wireless network of FIG. 1 may include, or implement aspects of, a home automation system. Home automation systems may demand accurate localization procedures for one or more wireless devices within the home automation system (e.g., such as for locating robot vacuums, for detecting the position of automatic blinds, for determining when various objects or devices have been moved by a user, among various other examples).

Another example application of one or more techniques described herein may include factory automation systems. For instance, factories implementing automation systems may demand accurate and precise localization procedures in order to determine and track the location and status of various factory devices or elements. In some cases, the wireless network of FIG. 1 may include, or implement aspects of, a factory automation system. The techniques described herein can be implemented such that various devices within factory automation systems can be aware of their environment (e.g., of the location/position of other devices) to avoid safety hazards, to run efficiently amongst each other, etc.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

A cloud 110 is a computer network configured to provide on-demand availability of computer system resources, such as data storage and computing power. In some examples, the cloud 110 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A server 115 provides one or more functions to users linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device, a personal computer, a laptop computer, a mainframe computer, a supercomputer, or any other suitable processing apparatus.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
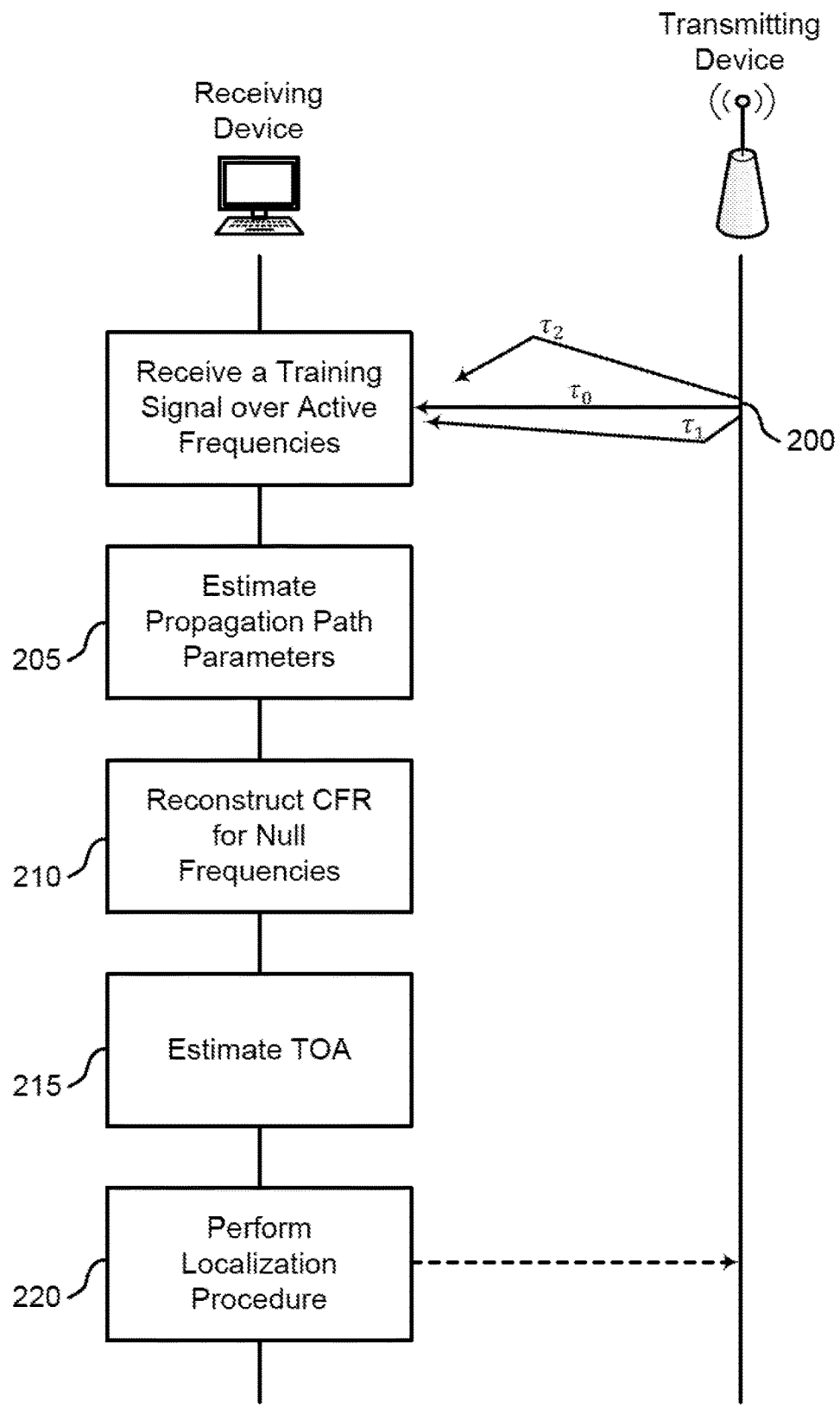
FIG. 2 shows an example of a process for time-of-arrival (TOA) estimation techniques according to aspects of the present disclosure.

FIG. 2 shows an example of a process for TOA estimation techniques according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for TOA estimation techniques is described. One or more embodiments of the method include estimating a number of radio propagation paths and a fading coefficient of each of the radio propagation paths based on a CFR value, where the CFR value is estimated based on a training signal over a set of active frequencies. One or more embodiments of the method further include reconstructing the CFR value for a set of null frequencies (e.g., based on the number of radio propagation paths and the fading coefficient of each of the radio propagation paths) and estimating a TOA parameter based on the reconstructed CFR value.

At operation 200, the system receives a training signal over a set of active frequencies. In some examples, the training signal is not received over a set of null frequencies. As described herein, accurate TOA estimation may be based on accurately estimating the timing of an earliest (e.g., first) arriving signal copy (e.g., of the training signal). For example, in cases where signal bandwidth is limited and propagation multipath is dense (e.g., in scenarios where signal propagation results in multiple paths or multiple signal copies due to objects and signal reflections in the environment), accurate estimation of the timing of the earliest received signal copy may result in more accurate TOA estimation and thus more accurate localization procedures. The example of FIG. 2 illustrates an example where signal copies are received over three radio propagation paths (e.g., p=3). An earliest received signal copy is associated with an earliest TOA ($\tau_0$) (e.g., which may correspond to a line-of-sight (LOS) path or a most direct path with the least amount of object reflections). Other signal copies that may be received based on a multipath scenario may be associated with later TOAs ($\tau_1$ and $\tau_2$). In some cases, the operations of this step refer to, or may be performed by, a device as described with reference to FIGS. 1 and 3.

At operation 205, the system estimates a number of radio propagation paths and a fading coefficient of each of the radio propagation paths based on a CFR value, where the CFR value is estimated based on the received training signal. In some examples, the number of radio propagation paths and the fading coefficient of each of the radio propagation paths is estimated based on SCC techniques or SAGE techniques. In some cases, the operations of this step refer to, or may be performed by, a multipath estimation component as described with reference to FIG. 3.

At operation 210, the system reconstructs the CFR value for a set of null frequencies based on the number of radio propagation paths and the fading coefficient of each of the radio propagation paths. In some cases, the operations of this step refer to, or may be performed by, a CFR reconstruction component as described with reference to FIG. 3.

At operation 215, the system estimates a TOA parameter based on the reconstructed CFR value. In some examples, the TOA parameter is estimated based on both the CFR value estimated based on the training signal over the set of active frequencies and the CFR value reconstructed for the set of null frequencies. In some examples, the TOA parameter is estimated based on root MUSIC techniques or MPLR techniques. In some cases, the operations of this step refer to, or may be performed by, a TOA estimation component as described with reference to FIG. 3.

At operation 220, the system performs a localization procedure based on the estimated TOA parameter. In some examples, operation 220 may include transmitting the estimated TOA parameter to the transmitting device. Additionally or alternatively, operation 220 may include transmitting estimated location or position information to the transmitting device. In some examples, operation 220 may include taking some action based on estimated location or position information (e.g., such as moving closer to the transmitting device, moving further away from the transmitting device, moving towards the center of a coverage area of the transmitting device, returning to a docking station, etc.). In some cases, the operations of this step refer to, or may be performed by, a device as described with reference to FIGS. 1 and 3.

Figure 3:
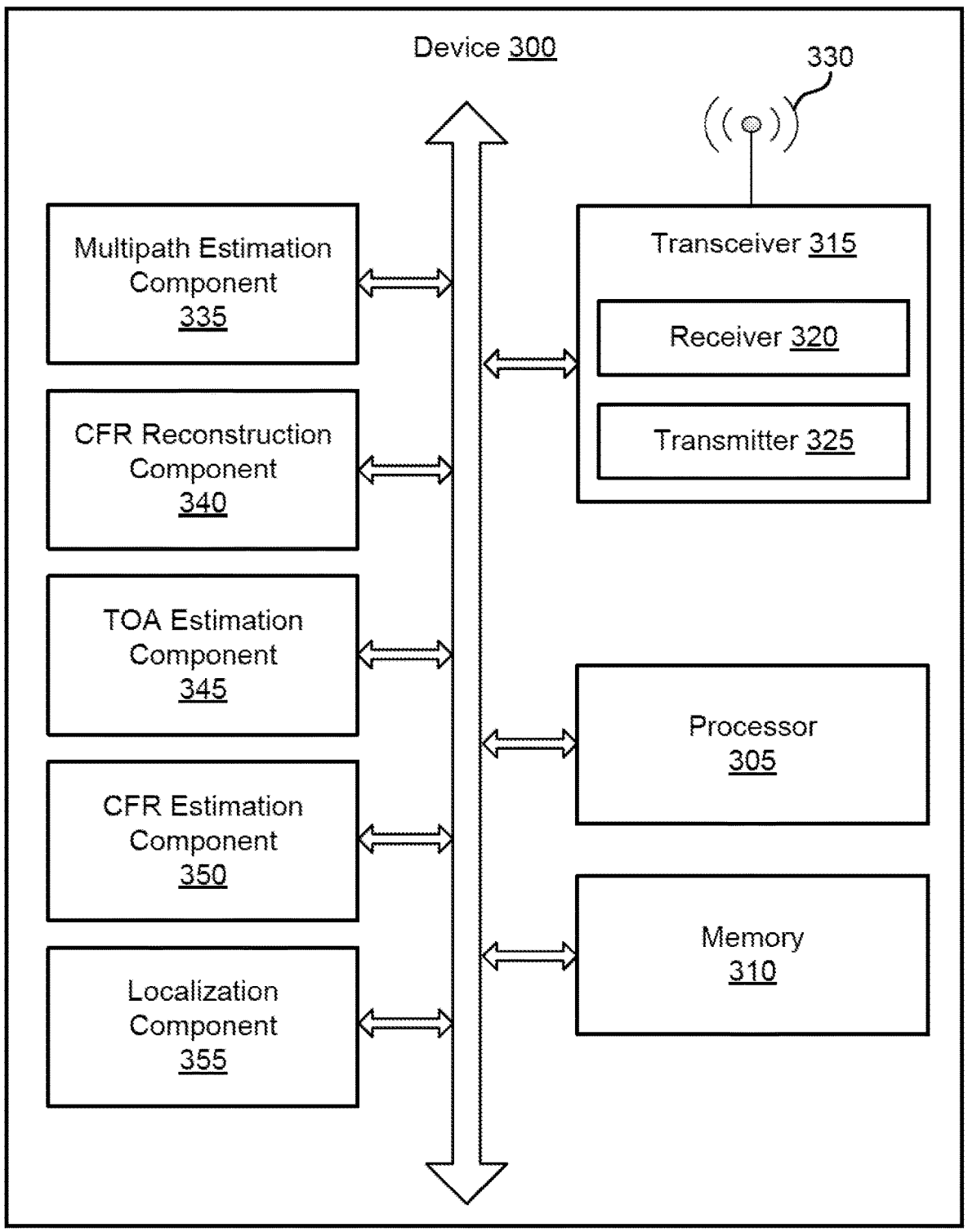
FIG. 3 shows an example of a device supporting TOA estimation techniques according to aspects of the present disclosure.

FIG. 3 shows an example of a device 300 supporting TOA estimation techniques according to aspects of the present disclosure. Device 300 is an example of, or includes aspects of, the corresponding element described with reference to FIG. 1. In one embodiment, device 300 includes processor 305, memory 310, transceiver 315, multipath estimation component 335, CFR reconstruction component 340, TOA estimation component 345, CFR estimation component 350, and localization component 355. In one embodiment, transceiver 315 includes receiver 320, transmitter 325, and antenna 330.

A device 300 supporting TOA estimation techniques is described. The device 300 includes a processor 305, memory 310 in electronic communication with the processor 305, and instructions stored in the memory 310. The instructions are operable to cause the processor 305 to perform the steps of estimating a number of radio propagation paths and a fading coefficient of each of the radio propagation paths based on a CFR value, where the CFR value is estimated based on a training signal over a set of active frequencies. The instructions are operable to further cause the processor 305 to perform the steps of reconstructing the CFR value for a set of null frequencies (e.g., based on the number of radio propagation paths and the fading coefficient of each of the radio propagation paths) and estimating a TOA parameter based on the reconstructed CFR value.

A processor 305 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device 300, a discrete gate or transistor logic component, a discrete hardware component, or any combination thereof). In some cases, the processor 305 is configured to operate a memory 310 array using a memory controller. In other cases, a memory controller is integrated into the processor 305. In some cases, the processor 305 is configured to execute computer-readable instructions stored in a memory 310 to perform various functions. In some embodiments, a processor 305 includes special purpose components for modem processing, baseband processing, digital signal processing, or transmission processing.

Examples of a memory device (e.g., memory 310) include random access memory 310 (RAM), read-only memory 310 (ROM), or a hard disk. Examples of memory 310 include solid state memory 310 and a hard disk drive. In some examples, memory 310 is used to store computer-readable, computer-executable software including instructions that, when executed, cause a processor 305 to perform various functions described herein. In some cases, the memory 310 contains, among other things, a basic input/output system (BIOS) which controls basic hardware or software operation such as the interaction with peripheral components or device. In some cases, a memory controller operates memory cells. For example, the memory controller can include a row decoder, column decoder, or both. In some cases, memory cells within a memory 310 store information in the form of a logical state.

Device 300 may include a single antenna 330, or more than one antenna 330, which may be capable of concurrently transmitting or receiving multiple wireless transmissions. In some cases, a device 300 with wireless capabilities may include an antenna 330 array.

A transceiver 315 may communicate bi-directionally, via antennas 330, wired, or wireless links as described above. For example, the transceiver 315 may represent a wireless transceiver 315 and may communicate bi-directionally with another wireless transceiver 315. The transceiver 315 may also include or be connected to a modem to modulate the packets and provide the modulated packets to for transmission, and to demodulate received packets. In some examples, transceiver 315 may be tuned to operate at specified frequencies. For example, a modem can configure the transceiver 315 to operate at a specified frequency and power level based on the communication protocol used by the modem.

A receiver 320 may receive information such as packets, user data, or control information associated with various information channels (e.g., control channels, data channels, etc.). Information received at a receiver 320 may be passed on to other components of the device 300, such as processor 305, multipath estimation component 335, CFR reconstruction component 340, TOA estimation component 345, CFR estimation component 350, localization component 355, etc. In some cases, receiver 320 may be an example of aspects of a transceiver 315. In various examples, receiver 320 may utilize a single antenna 330 or a plurality of antennas 330. According to some embodiments, receiver 320 receives the training signal over the set of active frequencies. In some examples, the training signal is not received over the set of null frequencies. In some examples, receiver 320 receives one or more copies of the training signal, where the TOA parameter is estimated for the earliest received training signal copy of the one or more copies of the training signal.

A transmitter 325 may transmit signals generated by other components. Information sent by a transmitter 325 may be received from other components of the device 300, such as a communication processor 305. In some cases, transmitter 325 may be an example of aspects of a transceiver 315. In various examples, transmitter 325 may utilize a single antenna 330 or a plurality of antennas 330. According to some embodiments, transmitter 325 transmits a signal based on the estimated TOA parameter.

According to some embodiments, multipath estimation component 335 estimates a number of radio propagation paths and a fading coefficient of each of the radio propagation paths based on a CFR value, where the CFR value is estimated based on a training signal over a set of active frequencies. In some examples, the number of radio propagation paths and the fading coefficient of each of the radio propagation paths is estimated based on successive cancellation (SCC) techniques or space-alternating generalized expectation-maximization (SAGE) techniques.

According to some embodiments, TOA estimation component 345 estimates a TOA parameter based on the reconstructed CFR value. In some examples, the TOA parameter is estimated based on both the CFR value estimated based on the training signal over the set of active frequencies and the CFR value reconstructed for the set of null frequencies. In some examples, the TOA parameter is estimated based on root multiple signal classification (MUSIC) techniques or MPLR techniques.

According to some embodiments, CFR estimation component 350 estimates the CFR based on the received training signal. In some examples, CFR estimation component 350 estimates CFR as a sum of fading coefficients weighted based on path-specific TOA parameters.

According to some embodiments, localization component 355 performs a localization procedure based on the TOA parameter.

A non-transitory computer readable medium storing code for TOA estimation techniques is also described. In some examples, the code comprises instructions executable by a processor to perform the steps of: estimating a number of radio propagation paths and a fading coefficient of each of the radio propagation paths based on a CFR value, wherein the CFR value is estimated based on a training signal over a set of active frequencies, reconstructing the CFR value for a set of null frequencies based on the number of radio propagation paths and the fading coefficient of each of the radio propagation paths, and estimating a TOA parameter based on the reconstructed CFR value.

A system for TOA estimation techniques is also described. One or more embodiments of the system include estimating a number of radio propagation paths and a fading coefficient of each of the radio propagation paths based on a CFR value, wherein the CFR value is estimated based on a training signal over a set of active frequencies, reconstructing the CFR value for a set of null frequencies based on the number of radio propagation paths and the fading coefficient of each of the radio propagation paths, and estimating a TOA parameter based on the reconstructed CFR value.

Some examples of the method, apparatus, non-transitory computer readable medium, and system described above further include receiving the training signal over the set of active frequencies. Some examples further include estimating the CFR based on the received training signal. In some examples, the training signal is not received over the set of null frequencies. In some examples, the TOA parameter is estimated based on both the CFR value estimated based on the training signal over the set of active frequencies and the CFR value reconstructed for the set of null frequencies.

In some examples, the TOA parameter is estimated based on root MUSIC techniques or MPLR techniques. Some examples of the method, apparatus, non-transitory computer readable medium, and system described above further include receiving one or more copies of the training signal, wherein the TOA parameter is estimated for an earliest received training signal copy of the one or more copies of the training signal.

In some examples, the number of radio propagation paths and the fading coefficient of each of the radio propagation paths is estimated based on SCC techniques or SAGE techniques. Some examples of the method, apparatus, non-transitory computer readable medium, and system described above further include estimating CFR as a sum of fading coefficients weighted based at least in part on path-specific TOA parameters.

Some examples of the method, apparatus, non-transitory computer readable medium, and system described above further include transmitting a signal based on the estimated TOA parameter. Some examples of the method, apparatus, non-transitory computer readable medium, and system described above further include performing a localization procedure based on the TOA parameter.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Figure 4:
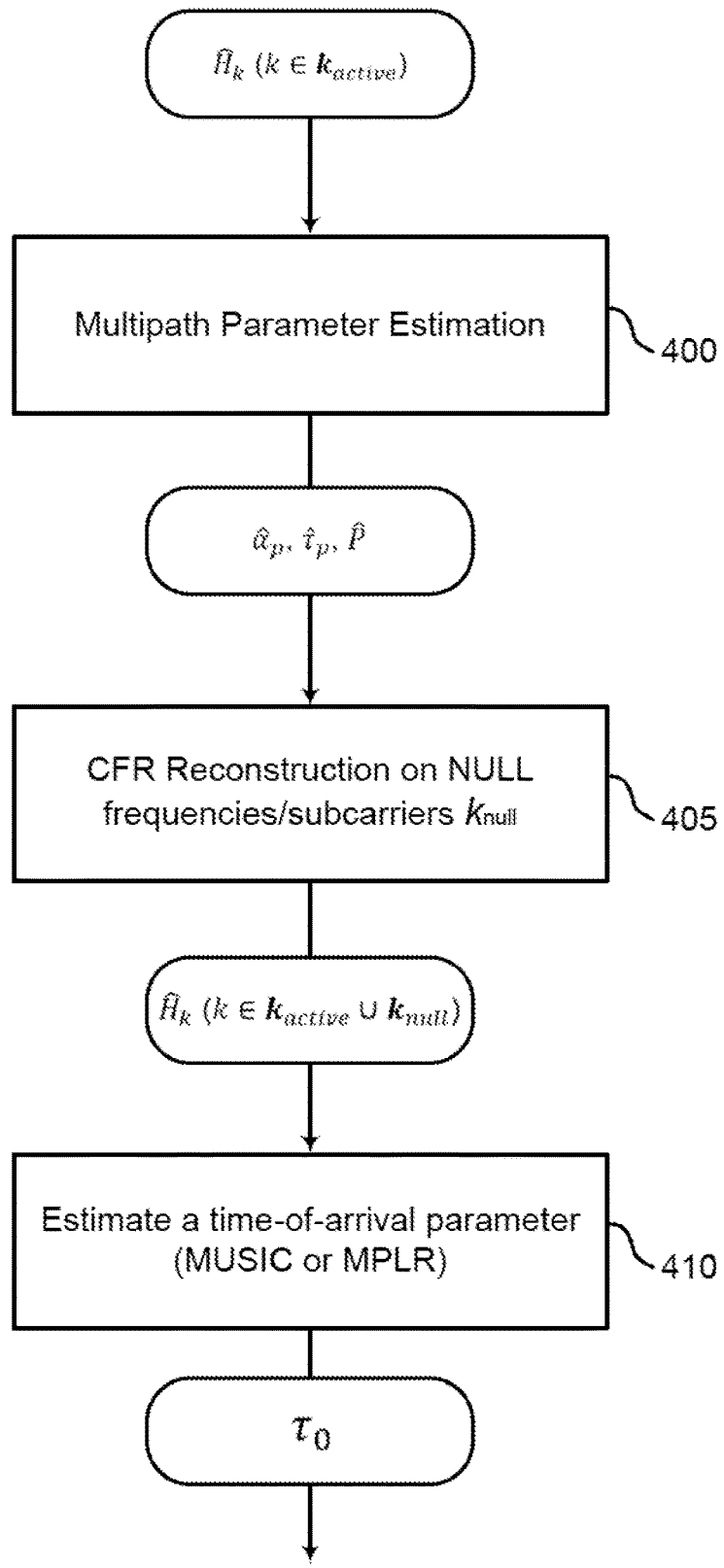
FIGS. 4 through 5 show examples of a process for TOA estimation techniques according to aspects of the present disclosure.

FIG. 4 shows an example of a process for TOA estimation techniques according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

TOA estimation is a key enabler for indoor localization techniques in various applications (e.g., smart homes offices, factory automation, etc.). However, application of indoor localization techniques may depend on the accuracy that can be achieved (e.g., as some applications, such as factory automation, may demand high accuracy localization of factory arms and other factory components for operational efficiency, safety, etc.). Accurate TOA estimation can depend on timing of the earliest arriving signal copy at receiver, which may be more difficult when the signal bandwidth is limited and the propagation multipath is dense. The techniques of the present disclosure outperform the other approaches by increasing TOA estimation accuracy in such scenarios.

The present disclosure proposes a new TOA estimation approach using response reconstruction (e.g., CFR reconstruction) on null frequencies over which training signals are not transmitted. CFR is performed based on multipath parameter estimation methods. After CFR, high-resolution techniques (e.g., MUSIC techniques, MPLR techniques, etc.) may be applied to estimate the TOA. The techniques described herein include a hybrid approach that combines multipath parameter estimation and TOA estimation algorithms.

In some cases, high resolution TOA estimation can be achieved using subspace based approaches, multipath parameter estimation based approaches, maximum peak-to-leakage ratio approaches, etc. Subspace based approaches (e.g., MUSIC techniques) estimate multipath TOA using a response (e.g., CFR) from training signals. Such approaches may estimate the TOA of the earliest path (e.g., the TOA of an earliest received copy of the training signal in a multipath scenario) for more accurate localization.

Multipath parameter estimation-based approaches estimate parameters of radio propagation paths (e.g., TOA, angle of arrival (AOA), doppler and fading coefficient, etc.). For instance, a ranging scheme (e.g., successive cancellation (SCC)) estimates TOA and its fading coefficient from the strongest to the weakest path. In some examples, a high resolution algorithm (e.g., space-alternating generalized expectation maximization (SAGE)) can be used to estimate TOA and fading coefficient iteratively, starting with an initial estimate. Some techniques may combine the principles of ranging schemes (e.g., SCC) and iterative searching, where the TOA and fading coefficient estimates in ranging schemes (e.g., SCC) are used for iterative searching derived from generalized estimations (i.e., maximum likelihood (ML) theory).

MPLR utilizes leakage power for distortion estimations in discrete time (e.g., CIR) obtained from response reconstruction approaches (e.g., CFR) in digital transmission systems (e.g., OFDM systems). However, MPLR approaches show distortions (i.e., CIR) when null subcarriers exist (e.g., DC and edge subcarriers are not used in many wireless communication systems, such as LTE and IEEE 802.11). A method to handle CIR distortions is to interpolate CFR on null subcarriers by assuming wireless channels as a single path. However, modeling wireless channels as a single path may not be practical for real world applications and reconstruction methods may degrade when more than one path with strong power exists.

The present disclosure includes multipath parameter estimation based on CFR on active frequencies used for training signals. CFR can be reconstructed on a set of null frequencies (e.g., frequencies or subcarriers without training signals). High-resolution techniques (e.g., MPLR or MUSIC algorithms) are applied using CFR on both estimated on active and reconstructed on null frequencies. The embodiments of the present disclosure create more CFR data on wider signal bandwidths (e.g., via reconstruction over null frequencies), which may increase TOA estimation accuracy of high-resolution techniques (e.g., MUSIC and MPLR algorithms). The present disclosure fills in CFR on null subcarriers in digital transmission systems (e.g., in OFDM systems), thus reducing CIR distortions in TOA estimation approaches (e.g., MPLR) and increasing the TOA estimation accuracy.

Input $\hat{H}_k$ includes the estimated response (i.e., CFR), which can be obtained at a baseband receiver with the help of training signals. For example (e.g., in IEEE 802.11), $\hat{H}_k$ can be obtained using a legacy long training field (L-LTF) on a set of active subcarriers $k_{active}$. $\hat{H}_k$ can be estimated as follows:

$$\hat{H}_k = \sum_{p=1}^{P-1} \alpha_p e^{-j2\pi k \Delta f \tau_p} + w_k, k \in k_{active} \quad (1)$$

where P denotes the number of radio propagation paths, k the frequency index, $\Delta f$ the frequency spacing (i.e., subcarrier spacing in OFDM systems), $\alpha_p$ the fading coefficient of the pth path, $\tau_p$ the TOA of the pth path, $w_k$ the additive noise and interference.

At operation 400, the system estimates a number of radio propagation paths and a fading coefficient of each of the radio propagation paths based on a CFR value. In some cases, the operations of this step refer to, or may be performed by, a multipath estimation component as described with reference to FIG. 3.

The hybrid method described in the present disclosure estimates number of paths $\hat{P}$, TOA $\hat{\tau}_p$ and fading coefficient $\hat{\alpha}_p$ of each path using multipath estimation approaches. $\hat{\tau}_0$, the TOA of the path associated with the earliest received signal copy, is the desired TOA used for localization procedures. Response reconstruction (e.g., CFR) on a set of null frequencies, i.e., the frequencies without training signal can be obtained as:

$$\hat{H}_k = \sum_{p=1}^{\hat{P}-1} \hat{\alpha}_p e^{-j2\pi k \Delta f \hat{\tau}_p}, k \in k_{null} \quad (2)$$

where $k_{null}$ is selected to optimize the final TOA estimation performance.

At operation 405, the system reconstructs the CFR value for a set of null frequencies. In some cases, the operations of this step refer to, or may be performed by, a CFR reconstruction component as described with reference to FIG. 3.

At operation 410, the system estimates a TOA parameter for the earliest copy of a received training signal. High resolution techniques (e.g., MUSIC or MPLR) are applied using active and reconstructed frequencies together (i.e., $\hat{H}_k$, $k \in k_{active} \cup k_{null}$) to re-estimate $\tau_0$. Such techniques can be implemented to obtain a more accurate estimation of $\tau_0$. In some cases, the operations of this step refer to, or may be performed by, a TOA estimation component as described with reference to FIG. 3.

The present disclosure provides increased accuracy in TOA estimation simulation results with an input response. For example, CFR can be estimated using IEEE 802.11 L-LTF with 20, 40 and 80 MHz signal bandwidth. For L-LTF, $\Delta f$=312.5 kHz, the active subcarriers set (0 represents the DC subcarrier) is 20 MHz ($k_{active}$=[−26: −1, 1: 26]), 40 MHz ($k_{active}$=[−58: −33, −31: −6, 6: 31, 33: 58]), and 80 MHz ($k_{active}$=[−122: −97, −95: −70, −58: −33, −31: −6, 6: 31, 33: 58, 70: 95, 97: 122]). $k_{null}=k_{full} \cap k_{active}$ is defined as the null subcarrier set, where $$k_{full} = -\frac{N}{2} : \frac{N}{2} - 1$$

($N$ = 64, 128 and 256 for 20, 40 and 80 MHz, respectively).

The channel model used is IEEE 802.11 channel-B.

The present disclosure provides high resolution techniques to increase estimation accuracy of TOA. For example, MPLR algorithm with $\hat{H}_k$ as input ($k \in k_{active} \cup k_{null}$ and $\hat{H}_k$=0 for $k \in k_{null}$) is compared with MPLR+single-path CFR reconstruction where $\hat{H}_k$ ($k \in k_{null}$) is reconstructed based on the assumption that channel has a single path. $\hat{H}_k (k \in k_{active} \cup k_{null})$ serves as the input into MPLR. MUSIC (utilizing $\hat{H}_k$) and multi-path parameters estimation (used for determining $\tau_0$) approaches are compared.

The present disclosure uses hybrid methods (i.e., MPLR and MUSIC with multi-path CFR reconstruction) to outperform high resolution techniques (i.e., MPLR, multi-path parameters estimation approaches) at user access (i.e., SNR) points, signal bandwidths, and single-path response (i.e., CFR) reconstruction methods. For example, at SNR points, the hybrid approach outperforms stand-alone multi-path parameters estimation for bandwidths (20 or 40 MHz), SNR (<30 dB) when bandwidth is 80 MHz and stand-alone MUSIC for bandwidths (40 or 80 MHz), SNR<30 dB when bandwidth is 20 MHz.

Figure 5:
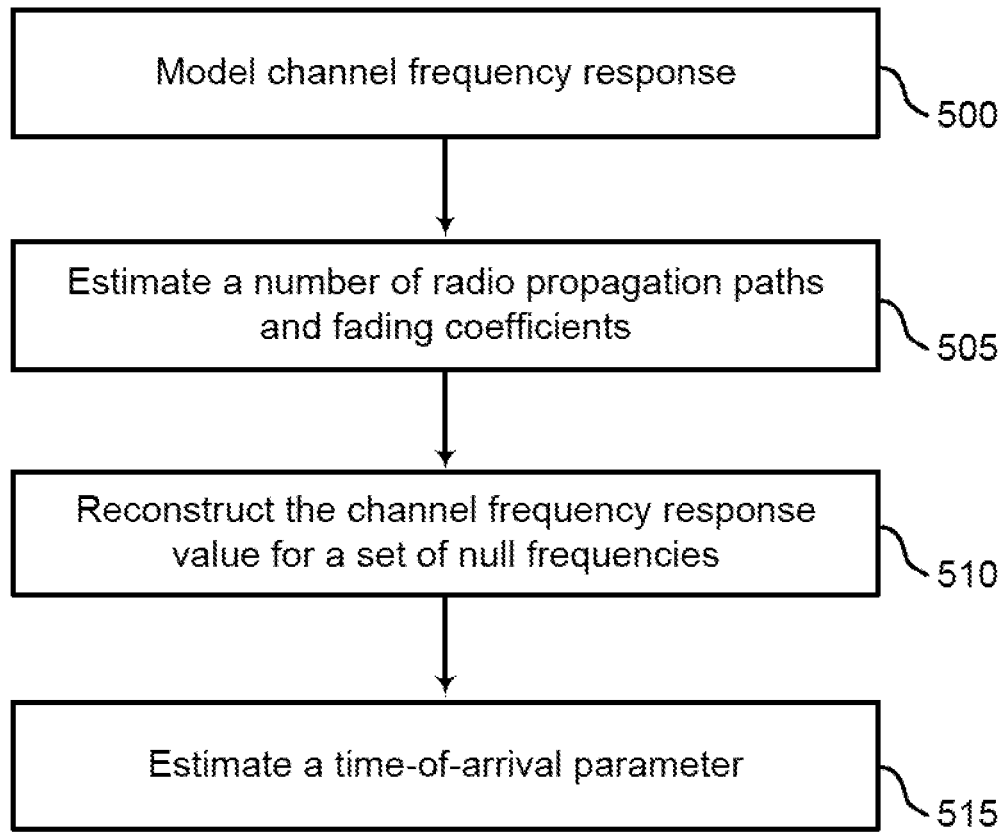

FIG. 5 shows an example of a process for TOA estimation techniques according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system estimates CFR as a sum of fading coefficients weighted based on path-specific TOA parameters. In some cases, the operations of this step refer to, or may be performed by, a CFR estimation component as described with reference to FIG. 3.

At operation 505, the system estimates a number of radio propagation paths and a fading coefficient of each of the radio propagation paths based on a CFR value. In some cases, the operations of this step refer to, or may be performed by, a multipath estimation component as described with reference to FIG. 3.

At operation 510, the system reconstructs the CFR value for a set of null frequencies based on the number of radio propagation paths and the fading coefficient of each of the radio propagation paths. In some cases, the operations of this step refer to, or may be performed by, a CFR reconstruction component as described with reference to FIG. 3.

At operation 515, the system estimates a TOA parameter based on the reconstructed CFR value. In some cases, the operations of this step refer to, or may be performed by, a TOA estimation component as described with reference to FIG. 3.

The described systems and methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a training signal over a set of active frequencies
estimating a number of radio propagation paths and a fading coefficient of each of the radio propagation paths based on a channel frequency response value estimated from the received training signal;
reconstructing the channel frequency response value for a set of null frequencies based on the number of radio propagation paths and the fading coefficient of each of the radio propagation paths;
estimating a time-of-arrival parameter based on the reconstructed channel frequency response value; and
performing a localization procedure based on the estimated time-of-arrival parameter.

2. The method of claim 1, further comprising:
estimating the channel frequency response based on the received training signal, wherein the training signal is not received over the set of null frequencies.

3. The method of claim 1, wherein:
the time-of-arrival parameter is estimated based on both the channel frequency response value estimated based on the training signal over the set of active frequencies and the channel frequency response value reconstructed for the set of null frequencies.

4. The method of claim 3, wherein:
the time-of-arrival parameter is estimated based on root multiple signal classification (MUSIC) techniques or maximum peak-to-leakage ratio (MPLR) techniques.

5. The method of claim 1, further comprising:
receiving one or more copies of the training signal, wherein the time-of-arrival parameter is estimated for an earliest received training signal copy of the one or more copies of the training signal.

6. The method of claim 1, wherein:
the number of radio propagation paths and the fading coefficient of each of the radio propagation paths is estimated based on successive cancellation (SCC) techniques or space-alternating generalized expectation-maximization (SAGE) techniques.

7. The method of claim 1, further comprising:
estimating channel frequency response as a sum of fading coefficients weighted based at least in part on path-specific time-of-arrival parameters.

8. The method of claim 1, wherein performing the localization procedure comprises:
transmitting a signal based on the estimated time-of-arrival parameter.

9. An apparatus comprising a processor and a memory storing instructions and in electronic communication with the processor, the processor being configured to execute the instructions to:
estimate a number of radio propagation paths and a fading coefficient of each of the radio propagation paths based on a channel frequency response value, wherein the channel frequency response value is estimated based on a training signal over a set of active frequencies;
reconstruct the channel frequency response value for a set of null frequencies based on the number of radio propagation paths and the fading coefficient of each of the radio propagation paths; and
estimate a time-of-arrival parameter based on the reconstructed channel frequency response value.

10. The apparatus of claim 9, the processor being further configured to execute the instructions to:
receive the training signal over the set of active frequencies; and
estimate the channel frequency response based on the received training signal.

11. The apparatus of claim 10, wherein:
the training signal is not received over the set of null frequencies.

12. The apparatus of claim 9, wherein:
the time-of-arrival parameter is estimated based on both the channel frequency response value estimated based on the training signal over the set of active frequencies and the channel frequency response value reconstructed for the set of null frequencies.

13. The apparatus of claim 12, wherein:
the time-of-arrival parameter is estimated based on root multiple signal classification (MUSIC) techniques or maximum peak-to-leakage ratio (MPLR) techniques.

14. The apparatus of claim 9, the processor being further configured to execute the instructions to:
receive one or more copies of the training signal, wherein the time-of-arrival parameter is estimated for an earliest received training signal copy of the one or more copies of the training signal.

15. The apparatus of claim 9, wherein:
the number of radio propagation paths and the fading coefficient of each of the radio propagation paths is estimated based on successive cancellation (SCC) techniques or space-alternating generalized expectation-maximization (SAGE) techniques.

16. The apparatus of claim 9, the processor being further configured to execute the instructions to:
estimate channel frequency response as a sum of fading coefficients weighted based at least in part on path-specific time-of-arrival parameters.

17. The apparatus of claim 9, the processor being further configured to execute the instructions to:
transmit a signal based on the estimated time-of-arrival parameter.

18. The apparatus of claim 9, the processor being further configured to execute the instructions to:
perform a localization procedure based on the time-of-arrival parameter.

19. A non-transitory computer readable medium storing code for time-of-arrival estimation techniques, the code comprising instructions executable by a processor to:
estimate a number of radio propagation paths and a fading coefficient of each of the radio propagation paths based on a channel frequency response value, wherein the channel frequency response value is estimated based on a training signal over a set of active frequencies;
reconstruct the channel frequency response value for a set of null frequencies based on the number of radio propagation paths and the fading coefficient of each of the radio propagation paths; and
estimate a time-of-arrival parameter based on the reconstructed channel frequency response value.

20. The non-transitory computer readable medium of claim 19, the code further comprising instructions executable by the processor to:
receive the training signal over the set of active frequencies, wherein the training signal is not received over the set of null frequencies; and
estimate the channel frequency response based on the received training signal.

* * * * *